United States Patent [19]

Jackson et al.

[11] Patent Number: 5,157,785
[45] Date of Patent: Oct. 20, 1992

[54] PROCESS CELL FOR AN N-DIMENSIONAL PROCESSOR ARRAY HAVING A SINGLE INPUT ELEMENT WITH 2N DATA INPUTS, MEMORY, AND FULL FUNCTION ARITHMETIC LOGIC UNIT

[75] Inventors: James H. Jackson; Ming-Chih Lee, both of Cary, N.C.; Mark R. LaForest, Waltham; Richard D. Fiorentino, Carlisle, both of Mass.

[73] Assignee: Wavetracer, Inc., Acton, Mass.
[21] Appl. No.: 530,027
[22] Filed: May 29, 1990
[51] Int. Cl.⁵ .................................. G06F 15/76
[52] U.S. Cl. ............................ 395/800; 364/DIG. 1; 364/228.7; 364/229.5; 364/230.6
[58] Field of Search ... 364/200 MS File, 900 MS File, 364/736; 395/800; 382/41

[56] References Cited

U.S. PATENT DOCUMENTS

| | | | |
|---|---|---|---|
| 3,537,074 | 10/1970 | Stokes et al. | 340/172.5 |
| 3,815,095 | 6/1974 | Wester | 340/172.5 |
| 3,815,097 | 6/1974 | Gardner et al. | 340/172.5 |
| 3,891,836 | 6/1975 | Lee | 235/151.12 |
| 3,902,160 | 8/1975 | Kawa | 340/146.3 |
| 3,936,885 | 2/1976 | Mutafelija | 444/1 |
| 3,970,993 | 7/1976 | Finnila | 340/172.5 |
| 3,979,728 | 9/1976 | Reddaway | 340/172.5 |
| 4,011,545 | 3/1977 | Nadir | 340/172.5 |
| 4,064,392 | 12/1977 | Desalu | 364/492 |
| 4,149,248 | 4/1979 | Pavkovich | 364/414 |
| 4,239,312 | 12/1980 | Myer et al. | 339/17 N |
| 4,247,892 | 1/1981 | Lawrence | 364/200 |
| 4,275,410 | 6/1981 | Grinberg et al. | 357/68 |
| 4,293,921 | 10/1981 | Smith, Jr. | 364/726 |
| 4,313,342 | 2/1982 | Poppendiek | 73/154 |
| 4,507,726 | 3/1985 | Grinberg et al. | 364/200 |
| 4,509,195 | 4/1985 | Nadler | 382/51 |
| 4,580,215 | 4/1986 | Morton | 364/200 |
| 4,598,400 | 7/1986 | Hillis | 370/60 |
| 4,621,339 | 11/1986 | Wagner et al. | 364/900 |
| 4,656,463 | 4/1987 | Anders et al. | 340/572 |
| 4,660,166 | 4/1987 | Hopfield | 364/807 |
| 4,667,308 | 5/1987 | Hayes et al. | 364/900 |
| 4,685,070 | 8/1987 | Flinchbaugh | 364/522 |
| 4,697,247 | 9/1987 | Grinberg et al. | 364/713 |
| 4,709,327 | 11/1987 | Hillis et al. | 364/200 |
| 4,720,780 | 1/1988 | Dolecek | 364/200 |
| 4,729,095 | 3/1988 | Colley et al. | 364/200 |
| 4,739,474 | 4/1988 | Holsztynski | 364/200 |
| 4,739,476 | 4/1988 | Fiduccia | 364/200 |
| 4,747,060 | 5/1988 | Sears, III, et al. | 364/481 |
| 4,766,534 | 8/1988 | DeBenedictis | 364/200 |
| 4,791,567 | 12/1988 | Cline et al. | 364/413.13 |
| 4,796,199 | 1/1989 | Hammerstrom et al. | 364/513 |
| 4,805,091 | 2/1989 | Thiel et al. | 364/200 |
| 4,809,346 | 2/1989 | Shu | 382/49 |
| 4,809,347 | 2/1989 | Nash et al. | 382/49 |
| 4,811,210 | 3/1989 | McAulay | 364/200 |
| 4,811,214 | 3/1989 | Nosenchuck et al. | 364/200 |
| 4,814,973 | 3/1989 | Hillis | 364/200 |
| 4,814,980 | 3/1989 | Peterson et al. | 364/200 |
| 4,821,220 | 4/1989 | Duisberg | 364/578 |
| 4,827,132 | 5/1989 | Moscovitch | 250/337 |
| 4,889,122 | 12/1989 | Watmough et al. | 128/399 |
| 4,942,517 | 7/1990 | Cok | 364/200 |
| 4,992,933 | 2/1991 | Taylor | 364/200 |
| 5,050,069 | 9/1991 | Hillis et al. | 364/200 |
| 5,058,001 | 10/1991 | Li | 364/736 |

OTHER PUBLICATIONS

"The Third Dimension", The 3-D Computer Demonstrates the Feasibility of the Wafer Approach, Byte, Nov. 1988, pp. 311-320.

Primary Examiner—Thomas C. Lee
Assistant Examiner—Richard Lee Ellis
Attorney, Agent, or Firm—Weingarten, Schurgin, Gagnebin & Hayes

[57] ABSTRACT

A multi-dimensional processor cell and processor array with massively parallel input/output includes a processor array having a plurality of processor cells interconnected to form an N-dimensional array. The system includes a first group of processor cells having 2N dimensionally adjacent processor cells. At least one input/output device is connected to a surplus data signal port of a second group of processor cells each having fewer than 2N dimensionally adjacent processor cells, for providing massively parallel input/output between the multi-dimensional processor array and the input/output device. The processor system also includes a front end processor for providing processor array instructions in response to application programs running on the front end processor. A processor cell controller, responsive to the processor array commands, broadcasts a sequence of processor cell instructions to all of the processor cells of the multi-dimensional processor array.

29 Claims, 4 Drawing Sheets

PROCESS CELL FOR AN N-DIMENSIONAL PROCESSOR ARRAY HAVING A SINGLE INPUT ELEMENT WITH 2N DATA INPUTS, MEMORY, AND FULL FUNCTION ARITHMETIC LOGIC UNIT

BACKGROUND OF THE INVENTION

Natural phenomena such as electric and magnetic files, fluid flows, sound waves, and heat flow are, at any given moment in time, represented as spatially distributed data in a three dimensional manner by a set of numbers whose indices represent spacial positioning along three mutually orthogonal axes. On occasion, a fourth dimension, namely time, must also be considered. To date, scientists and other computer users wishing to solve partial differential equations that involve spatially distributed data such as Poisson's or Maxwell's equations have had limited data processing capabilities because prior art processor systems and processor arrays have been limited to two-dimensional architectures.

Prior art attempts at solving three-dimensional equations utilizing purely one- or two-dimensional arrays have yielded processing systems requiring a large amount of "processor overhead" to calculate an index or address pointer to the second or third dimension of the spatial data which must be stored in memory and not in a processor. For example, in a traditional single processor computer, computing the Z or third dimension index requires up to three multiplications and two addition steps. On a two-dimensional computer, although the X and Y axes are directly accessible, the Z pointer must be calculated which still requires up to one multiplication and one addition.

Prior art attempts at dealing with three-dimensional data also include the utilization of an interconnection arrangement such as that disclosed in U.S. Pat. No. 4,814,973 in which routers may be instructed to switch data between processor cells in a fashion that mimics the behavior of a three-dimensional processor array. Routers, however, require a large amount of processor overhead to move data between the various processor cells. In addition, supporting control circuitry is required to perform the switching function. System throughput or bandwith is significantly compromised by the router overhead, and system cost and reliability are compromised due to the necessity of including the routers and associated control circuitry.

Additionally, because a given processor in a two or one dimensional array can communicate only with adjacent processors, input and output to the array is considerably restricted and necessarily limited to a predetermined bandwith which is determined by the number of processors along one edge of the array and the system clock speed.

SUMMARY OF THE INVENTION

A multi-dimensional processor array is disclosed for processing data structured in two or more dimensions. Such a multi-dimensional processor array includes a plurality of processor cells interconnected to form an N dimensional array where N is typically three or more dimensions. Each of the processor cells has 2N data signal ports for transmitting and receiving data to and from at least 2N devices.

In a preferred embodiment, the multi-dimensional processor array is configured as a three-dimensional array having defined rows, columns and levels of depth, and in which each processor cell includes six data signal ports operative for transmitting and receiving data to and from up to six dimensionally adjacent processor cells or data communications devices. The processor cells are arranged in a three-dimensional array forming a first group of processor cells having six dimensionally adjacent processor cells, and a second group of processor cells having fewer than six dimensionally adjacent processor cells. Accordingly, each processor cell in the second group of processor cells includes at least one unconnected or surplus data signal port having the capability for connecting to one communication device such as an input/output device or additional memory. The preferred embodiment further includes at least one input/output device coupled to the surplus data signal ports of the second group of processor cells, for transferring data between the input/output device and the second group of processor cells. A selected number of the processor cells having 2N dimensionally adjacent processor cells each also have at least one data signal port coupled to additional memory or to an input/output device, which, when combined with the surplus data signal ports of the second group of processor cells, provide massively parallel input/output between the multi-dimensional processor array and the input/output device.

Also disclosed is a multi-dimensional processor system, for processing multi-dimensionally structured data. Such a system includes a front end processor, for providing processor array commands in response to application programs running on the front end processor. A processor cell controller, responsive to the processor array commands, provides a sequence of processor cell instructions to all of the processor cells of the multi-dimensional processor array.

In a preferred embodiment, the processor cell controller of the multi-dimensional processor array converts processor array commands received from the front end processor operating as a preprocessor device, into intermediate commands or instruction words called macro-instructions, while a serializer converts these macro-instructions into a sequence of processor array cell instructions call nanoinstructions.

DESCRIPTION OF THE DRAWINGS

These and other features of the present invention will be better understood by reading the following detailed description of the invention, taken together with the drawings, wherein.

DETAILED DESCRIPTION OF THE INVENTION

Figure 1:
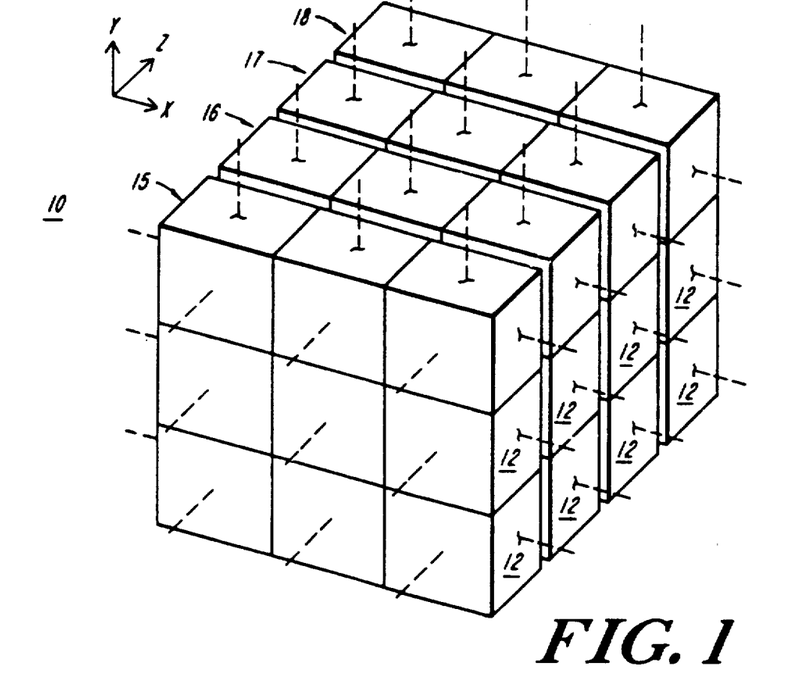
FIG. 1 is an illustration of a three-dimensional $3 \times 3 \times 4$ processor array comprises of 36 processor cells.

The multi-dimensional processor array herein disclosed typically includes a multi-dimensional array of three or more dimensions. The three dimensional processor array 10 illustrated in FIG. 1 is a 3×3×4 array, comprised of (4) four, two dimensional 3×3 sub-arrays 15-18 of processor cells 12.

Each processor cell of the N dimensional array includes 2N data signal ports operative for forming data signal paths for transmitting and receiving data to and from at least 2N adjacent processor cells or data communication devices. In this example, each processor cell 12, shown in FIG. 2, of each sub-array such as sub-array 16, (shown in an exploded view) includes six data signal ports 20a-20f, which allow each processor cell to send and receive data to and from at least six adjacent processor cells or data communication devices such as input/output devices or extended memory.

Figure 2:
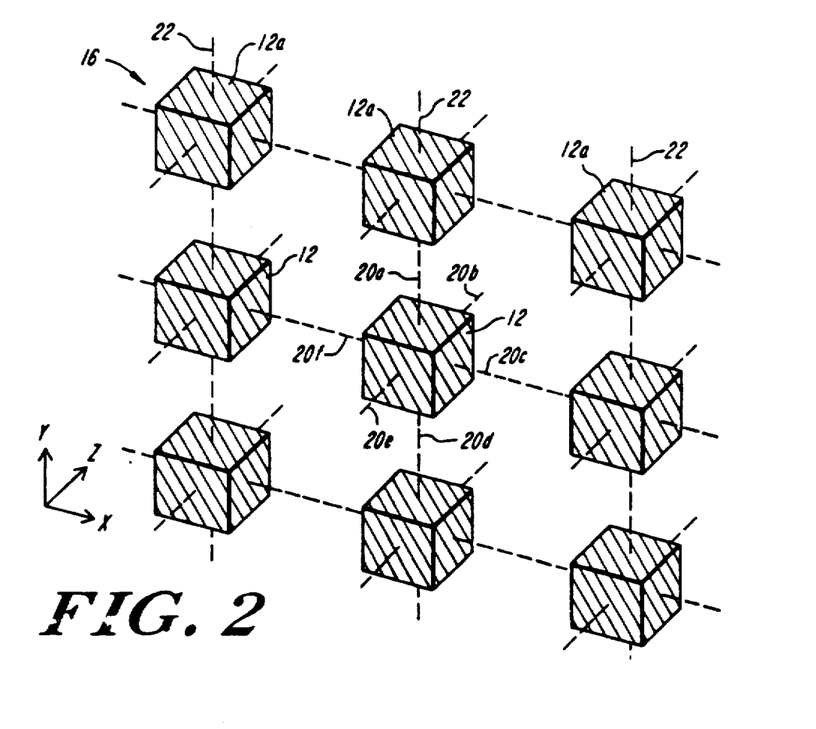
FIG. 2 is a partially exploded view of the three-dimensional processor array of FIG. 1.

Although each processor cell is adapted for transferring data to and from at least six adjacent processor cells or data communication devices, not all processor cells are conceptually positioned adjacent to or interconnected with six processor cells. For example, a number of processor cells such as processor cells 12a are conceptually located on one of the "faces" of the multi-dimensional processor array, and have at least one data signal port 22 which, for a given array configuration, is surplus or whose signal port is ignored. Such surplus signal ports 22 form the basis of the reconfigurable multi-dimensional array disclosed in U.S. patent application Ser. No. 07/528,962 entitled Dimensionally Reconfigurable Multi-Dimensional Processor Array, filed concurrently herewith assigned to the same assignee as the instant application and incorporated herein by reference.

Figure 3:
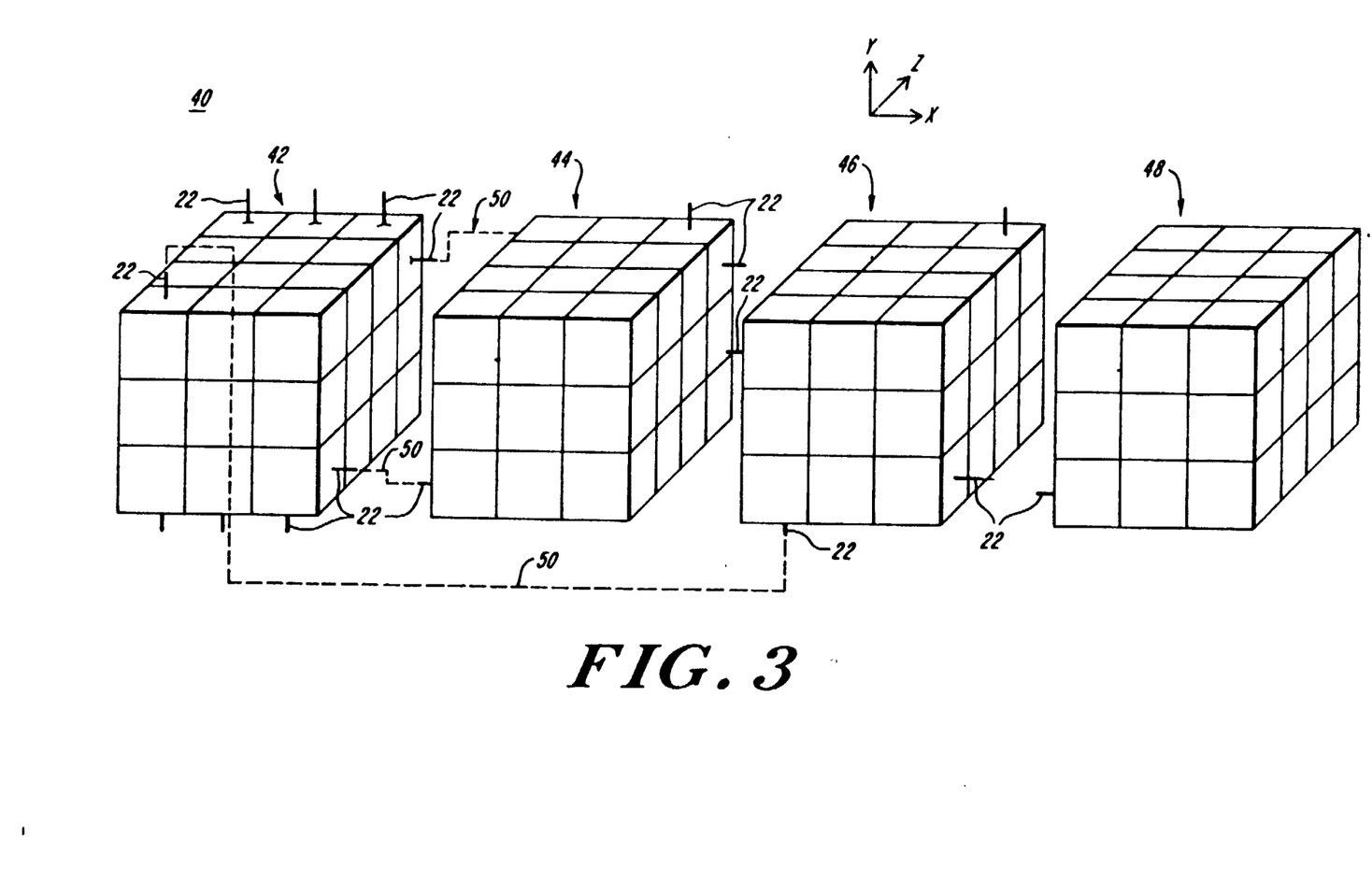
FIG. 3 is a representation of a four-dimensional $3 \times 3 \times 3 \times 3$ processor array according to this invention.

The multi-dimensional processor array of the present invention is not limited to a three dimensional array. It is a feature of the invention that a multi-dimensional array of N-dimensions may be arranged by providing a plurality of processor cells having 2N data signal ports as illustrated in FIG. 3 wherein is shown four dimensional array 30 comprised of a plurality of three dimensional sub-arrays 32-36. Three dimensional sub-arrays 32-36 may include any number of processor cells 12, each having 2N, or in this example 8, data signal ports. In addition to the 6 data signal ports provided for interconnecting processor cells 12 as a three dimensional sub-array, each processor cell 12 includes two additional data signal ports 20g and 20h. For the purposes of clarity, the other interconnections between the three dimensional sub-arrays are omitted. The additional data signal ports 20g and 20h allow a given processor cell 12 from one three dimensional sub-array to interconnect with a corresponding processor cell in a dimensionally adjacent three dimensional sub-array, thereby forming a four dimensional array.

The concept of a four dimensional array can be better understood by considering, for example, each processor cell of three dimensional sub-arrays 32-36 as corresponding to a spatial position, with three dimensional sub-array 34 representing spatial data at a given time; three dimensional processor sub-array 32 representing spatial data at a time prior to that of sub-array 34; and finally with three dimensional sub-array 36 representing spatial data at a time after that of sub-array 34. It is therefore apparent that a four dimensional array according to the present invention is capable of solving a four dimensional problem as would be involved in solving equations necessitation the resolving of three dimensional spatial data over a period of time. The present invention is not to be limited to a four dimensional processor array since it is evident that the array may be expanded to N-dimensions by providing additional data signal ports interconnecting corresponding processor cells in any given number of sub-arrays.

Figure 4:
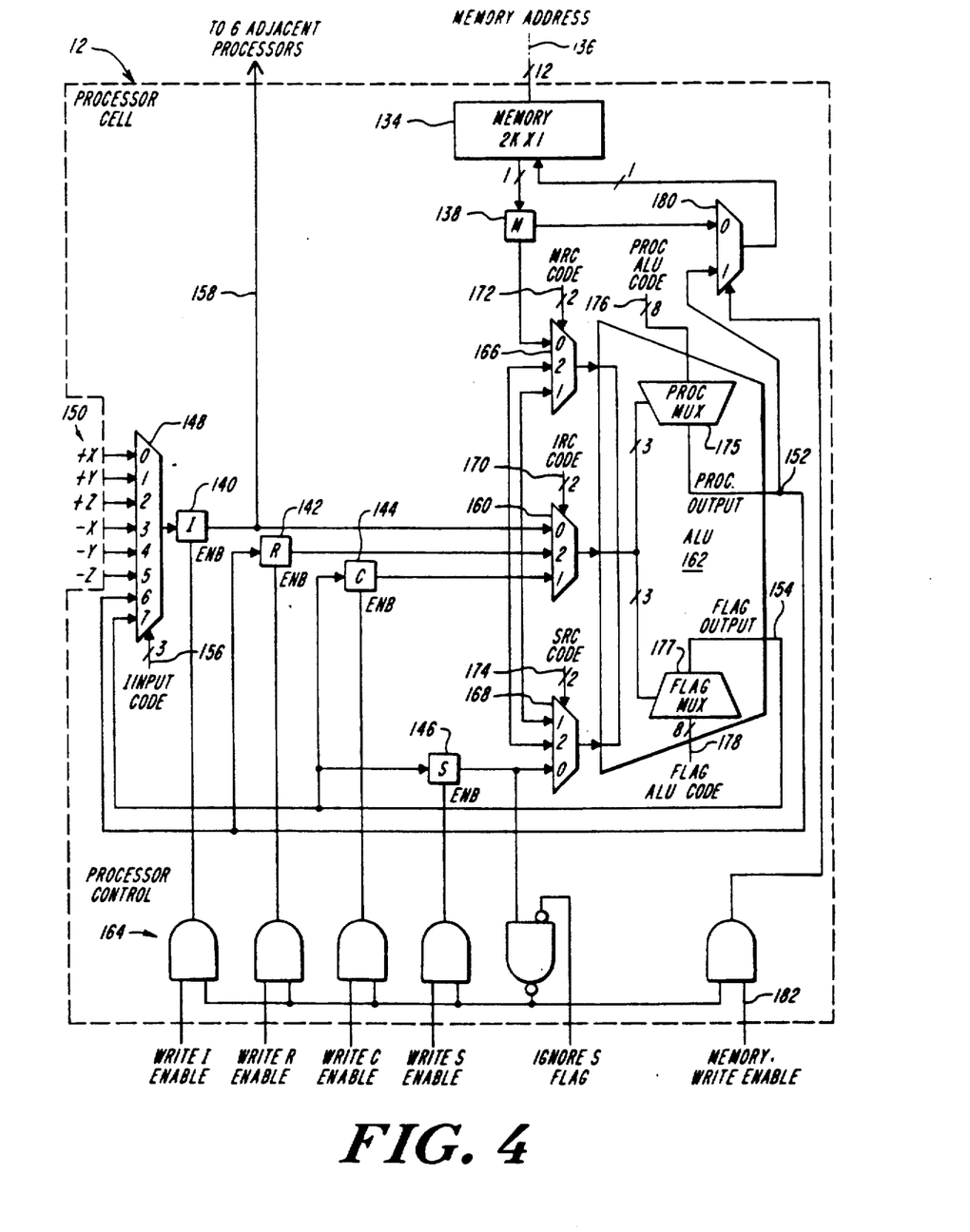
FIG. 4 is a block diagram illustrating the internal structure of a processor cell according to this invention.

The international structure of each of the processor cells 12 is illustrated in greater detail in FIG. 4. Each processor cell in the preferred embodiment includes a 2,048 bit memory 134, each bit of which is addressable under control of memory address bus 136. The 12 bits of memory address bus 136, of which one bit is currently unused and reserved for expansion, are part of the nanoinstruction received from the system instruction serializer described below.

Each processor cell 12 also includes a one bit memory latch 138 as well as a one bit I register 140, R register 142, C register 144 and S register 146. I register 140 is an interprocessor communication register and receives a one bit input from input multiplexor 148. Input multiplexor 148 accepts input from six adjacent processor ell outputs 150 in the +X, +Y, +Z, −X, −Y and −Z directions. Additionally, input multiplexor 148 also receives as input processor output 152, as well as flag output 154. Multiplexor 148 outputs one bit to I register 140 as a function of a three bit In input Code 156. The three bit I Input Code is also a part of the nanoinstruction. Although each nanoinstruction is comprised of 60 bits, only 43 bits go to each processor cell. Definition of the various bits that comprise these 43 bits of the nanoinstruction are represented in Table 1 reproduced below.

TABLE 1

| Nanoinstruction Fields | | | |
|---|---|---|---|
| Field | | | Width |
| Memory address | | | 12 |
| Processor output ALU function | | | 8 |
| Flag output ALU function | | | 8 |
| I input | | | 3 |
| 0: +X | 3: −Y | 6: Processor output | |
| 1: +Y | 4: −X | 7: Flag output | |
| 2: +Z | 5: −Z | | |
| MRC Code | | | 2 |
| 0: Memory latch | 1: C | 2: R | |
| IRC Code | | | 2 |
| 0: I | 1: C | 2: R | |
| SCR Code | | | 2 |
| 0: S | 1: C | 2: R | |
| Write memory enable | | | 1 |
| Write I register enable | | | 1 |
| Write R register enable | | | 1 |
| Write S flag enable | | | 1 |
| Write C flag enable | | | 1 |
| Ignore S flag | | | 1 |

As represented in Table 1, the three bit I Input Code selects one of the inputs to input multiplexor 148 as a function of the three I Input Code bits 156. For example, if the I Input Code bits are all set to zero, the +X input to input multiplexor 148 is directed to I register 140. The output from I register 140 is directed to output signal path 158 which is connected to six adjacent processor cells as one of its inputs 150, and to IRC multiplexor 160 which provides one of the inputs to ALU 162.

Writing to the I, R, C and S registers, as well as the memory, is enabled by means of processor control circuitry 164 under control of the appropriate write enable bits and the ignore S flat bit from the nanoinstruction, as well as the S flag.

Each processor cell reads and writes data once during each nanoinstruction cycle. A typical nanoinstruction cycle in the present embodiment is approximately 125 nanoseconds in duration, with a 62.5 nanosecond read phase followed by a 62.5 nanosecond write phase, although any appropriate read and write phase timing period may be employed.

During the first half of each nanoinstruction cycle, each processor cell reads the bit from its memory location specified by the 12-bit memory address given in the nanoinstruction. The bit is read into memory latch 138. Three 3-to-1 multiplexors 160, 166, 168 select three of the five possible input bits under control of the respective multiplexor codes, namely; IRC multiplexor code 170, MRC multiplexor code 172 and SRC multiplexor code 174.

There are five possible input bits to the ALU 162. The five possible input bits include the memory bit from memory latch 138, along with one bit from each of the I, R, C and S internal registers 140–146 respectively. The MRC, IRC and SRC codes also form part of the nanoinstruction and are identified in the nanoinstruction definition represented in Table 1 above.

ALU 162 accepts three 1-bit inputs, and produces two output bits, namely processor output 152 and flag output 154. To permit each of the ALU output bits to be independently selected by the three input bits, ALU 162 is implemented as two 8-to-1 multiplexors including processor multiplexor 174 and flag multiplexor 177. The three inputs bits provide a control code for selecting one bit from each multiplexor as illustrated in Table 2 shown below.

TABLE 2

| Memory Input MRC Mux | Processor Input IRC Mux | Flag Input SRC Mux | ALU Code Bit Position |
|---|---|---|---|
| 0 | 0 | 0 | 0-LSB |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7-MSB |

Eight data bits are supplied to each of ALU multiplexors 175 and 177 by separate 8 bit ALU code fields 176 and 178 of the nanoinstruction. The 8 bit processor ALU code 176 and the flag ALU code 178 are selected to represent the desired function or result of any logical operation performed on one or more of the three multiplexor control bits. For example, if memory data stored in memory latch 138 is to be directed to processor output 152, the two bit MRC code 172 which controls MRC multiplexor 166 would be set to 00, see Table 1. Processor ALU code 176 would then be set to 11110000. With this processor ALU code, a "0" from the memory latch 138 and MRC multiplexor 166 will produce a "0" on processor output 152 regardless of the state of the two remaining inputs to the processor multiplexor. See Table 2. Similarly, a logic "1" from memory latch 138 will produce a logic "1" on processor output 152 regardless of the state of the two remaining input bits to the ALU from the IRC and SRC multiplexors.

Processor output 152 is directed to memory write data multiplexor 180 which selects either memory read data from memory latch 138 or ALU processor output 152, either of which may be written back into memory during the second half or write phase of the nanoinstruction cycle. Control of memory write data multiplexor 180 is accomplished under direction of memory write enable signal 182 and the Ignore S flat signal, both of which are part of the nanoinstruction, as well as by the S register 146. Processor output 152, as well as flag output 154 are directed to I input multiplexor 148. Additionally, the ALU processor output 152 serves as input to R register 142, while flag output 154 is directed as input to C and S registers 144 and 146 respectively.

Figure 5:
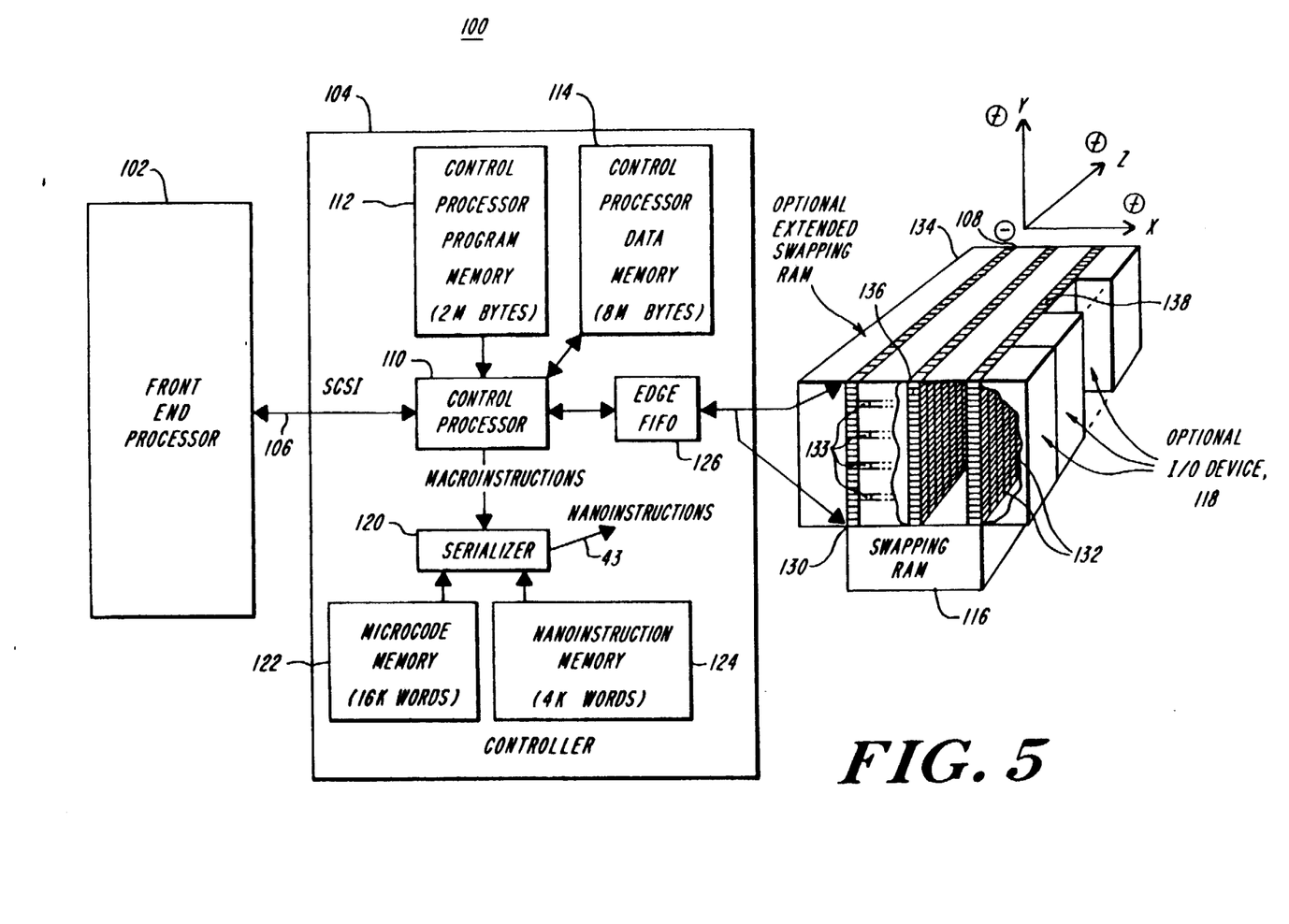
FIG. 5 is a schematic representation of the multi-dimensional processor system and processor array according to this invention, illustrating the massively parallel input/output feature of the invention.

FIG. 5 illustrates the multi-dimensional processor system 100 of the present invention incorporating a plurality of such processor cells. The system includes an appropriate frond end processor 102 which serves as a command preprocessor interfacing with processor controller 140 by means of an interface such as a small computer system interface (SCSI) 106. In the preferred embodiment, front end processor 102 is a conventional computer operating under control of a Unix TM operating system. An example of such a front each processor is a Sun workstation available from Sun Microsystems. Front end preprocessor 102 includes a standard C compiler as well as a preprocessor for the C compiler which allows the system to compile and operate programs written using parallel processing extensions to the C language.

Processor controller 104 provides intermediary processing functions between front end processor 102 and processor array 108. Controller 104 includes control processor 110 which in the preferred embodiment is an AMD-29000 processor. Control processor 110 operates under control of a processor program stored in processor program memory 112. Control processor 110 receives commands to initialize processor array 108, as well as to control input/output transfers between processor array 108, front end processor 102, swapping RAM 116, optional extended swapping ram 134 and optional I/O devices 118. Control processor data memory 114 provides temporary data and processor variable storage to control processor 110.

Front end processor 102 communicates with control processor 110, sending commands to and reading data from the control processor in response to selected commands. Each command normally describes word-oriented unary or binary operations such as ones complement or multiplication. Control processor 110 identifies such commands, and reformats them as a sequence of word-oriented commands called macroinstructions. Macroinstructions are transferred to serializer 120 by initializing registers located within the serializer. Serializer 120 operates under control of microcode stored in microcode memory 122 and converts each word-oriented macroinstruction into a sequence of bit-oriented commands including processor cell instructions and memory addresses called nanoinstructions which are transmitted to all processors of processor array 108. It is understood that any hardware of software which converts word-oriented to bit-oriented commands may be utilized and is well known to those skilled in the art. An example of such a serializer is illustrated in copending U.S. patent application Ser. No. 529,947 entitled Virtual Processing Instruction and Address Generator for Parallel Processor Array, assigned to the same assignee as the instant invention and incorporated herein by reference. Nanoinstruction memory 124 contains a table of nanoinstruction templates that serializer 120 accesses to form nanoinstructions for the processor array.

The following is an example of a command transfer from the front end processor 102 to control processor 110. By way of illustration, front end processor 102 may send a sequence of 32-bit words for the command "d=e+f" over the small computer system interface 106 to control processor 110. Such a sequence of 32-bit words is illustrated in Table 3 reproduced below.

TABLE 3

| 32 bits |
| --- |
| Code = add e+f→d |
| d (LSB address) |
| W(d) = n width of d |
| e(LSB = address) |
| w(e) |
| f (LSB address) |
| w(f) |

During the first step of the command transfer, front end processor 102 transmits a 32 bit wide operation code corresponding to the operation "add" to control processor 110. During the second step of the command transfer, the front end processor transmits the memory address of the least significant bit of the parallel variable d. Parallel variables are variables that reside int he same memory location in each processor cell. During the third step of the transfer, the front processor transmits the width of number of bits includes in the variable d. Similarly, the fourth through seventh steps of command transfer include transmitting the address of the least significant bit and width of the parallel variables e and f respectively.

From each command, control processor 110 generates one or more macroinstructions which are transmitted to serializer 120. The control processor transmits each macroinstruction to the serializer by initializing registers located within the serializer.

After receiving the macroinstruction, serializer 120 begins generation of the corresponding sequence of nanoinstructions which is broadcast to all of the processor cells in processor array 108.

code are not necessary and will, be definition, be logic zeros. See also Table 2. The next portion of the nanoinstruction is the two bit MRC code 00 which indicates that the MRC multiplexor will select data from the memory latch. Since this cycle is not concerned with data from either the IRC or SRC multiplexors, both the IRC and SRC codes are irrelevant during this cycle. Finally, the R enable is set to indicate that the processor output is to be stored in the R register.

During the second cycle of the nanoinstruction generation wherein a second nanoinstruction is provided, the object of the cycle is to access the data bit stored at the f memory location and add that bit to the previously accessed bit from the e memory location which is now stored int he R register of each processor cell. To accomplish this, serializer 120 provides the memory address f followed by the processor ALU code 00111100. The particular processor ALU code represents that as long as either the R register or the memory latch, but not both, is et to a logic 1, the processor output will be a 1. If neither the R register nor the memory latch are a logic 1, or if both are a logic 1, the processor output will be a logic 0. This corresponds to the possible results of the addition of two bits. Next, the serializer sets the flag ALU code to 11000000. This indicates that if both the memory latch and the R register are set to 1, the flag output will be set to 1. This will enable the processor to store a carry condition if both bits being added are a logic 1. As in the first cycle, since no input is being received from an adjacent processor cell, the input code is not required. The two bit MRC code is set to 00 to indicate that data from the memory latch is to be read into the MRC multiplexor, while the IRC code is set to 10 to indicate that data from the R register is to be processed through the IRC multiplexor. Finally, the R and C enables are set to indicate that the results of the processor output are to be latched in the R register while the results form the flag output will be latched in the C register to indicate a carry.

The purpose of the third cycle shown in the nanoinstruction sequence of Table 4 is to store the result of the addition of the first two bits located at memory addresses e and f into the memory location at memory

TABLE 4

| Bits | 12 | 8 | 8 | 3 | 2 | 2 | 2 | 1 | 1 | 1 | 1 | 1 | 1 |
| --- | --- | --- | --- | --- | --- | --- | --- | --- | --- | --- | --- | --- | --- |
| | | P | F | | | | | | Enables | | | | |
| Cycle | Memory Address | ALU MSB LSB | ALU MSB LSB | Input Code | MRC Code | IRC Code | SRC Code | MEM | I | R | S | C | Ign. S |
| 1 | e | 11110000 | ~ | ~ | m(00) | ~ | ~ | 0 | 0 | 1 | 0 | 0 | 0 |
| 2 | f | 00111100 | 11000000 | ~ | m(00) | r(10) | ~ | 0 | 0 | 1 | 0 | 1 | 0 |
| 3 | d | 11110000 | ~ | ~ | r(10) | ~ | ~ | 1 | 0 | 0 | 0 | 0 | 0 |
| 4 | e+1 | 11110000 | ~ | ~ | m(00) | ~ | ~ | 0 | 0 | 1 | 0 | 0 | 0 |
| 5 | f+1 | 10010110 | 11101000 | ~ | m(00) | r(10) | c(01) | 0 | 0 | 1 | 0 | 1 | 0 |
| 6 | d+1 | 11110000 | ~ | ~ | r(10) | ~ | ~ | 1 | 0 | 0 | 0 | 0 | 0 |

Note ~ = don't care

During the first cycle of nanoinstruction generation illustrated in Table 4 above, the object of the nanoinstruction is to move the one bit of data pointed to by memory address e to the R register located within each processor cell. To accomplish this, serializer 120 produces a 16 bit memory address (four bits of which are now unused) corresponding to memory address e which is the address of the least significant bit of data. Next, the serializer produces a processor ALU code which will produce a processor output of "0" if the data stored at memory address e is a logic 0, and a processor output of "1" if the data stored at memory address e is a logic 1. During this cycle, the flag ALU code and the input address d. Accordingly, the serializer first generates the memory address d and the processor ALU code which directs that the input from the MRC multiplexor will be passed through the processor multiplexor to the processor output. The MRC code is set to 10 indicating that the MRC multiplexor is to select input from the R register. Lastly, the memory enable bit is set so that during the nanoinstruction write phase, the processor output is written into memory address d. This compels the processor cell's half-add of the least significant bits (bit position 0) of a data field that is n bits wide.

The fourth, fifth and sixth cycles of the nanoinstruction sequence perform a full add of the bits located at bit position 1 which are stored at memory addresses $e+1$ and $f+1$. During cycle 4, data is ready from memory address $e+1$ and stored in the R register as described during cycle 1. During cycle 5, the nanoinstruction bit sequence directs each processor cell of the processor array to add the bits located at memory address $f+1$ to the bit stored in the R register which was derived from memory address $e+1$ during cycle 4, along with any carry that was generated during the half-add in cycle 2 and stored in the C register. Accordingly, the processor ALU code at cycle 5 is selected to provide a logic 1 on the processor output as long as only one of either the memory bit, the R register bit or the C register bit are set to a logic 1, or if all three bits are set to a logic 1. The flat ALU code, in contrast, is selected such that a logic 1 will be provide don the flag output whenever two or more of the three bits are set to a logic 1, indicating a carry.

The two bit MRC code is set to 00 to indicate input from the memory latch while the IRC code is set at 10 to select input from the R register. The SRC code is set to 01 to select input from the C register. The R enable bit is set to allow processor output to be stored in the R register while the C enable bit is set to allow the carry to be stored in the C register. Finally, cycle 6 is identical to cycle 3 in that it provides a nanoinstruction that directs each processor cell of the processor array to store the contents of the R register which represents the result of adding bit position 1, in a memory location indicated by memory address $d+1$.

Cycles 4, 5 and 6 are repeated n-2 more times in order to perform the addition indicated by the command $d=e+f$ for e and f of n bits in width.

Bi-directional edge FIFO 126 buffers input/output data transfer between control processor 110 and processor array 108. Edge FIFO is so named because it connects to the $(-X, -Z)$ edge 130 of processor array 108. Since processor array 108 typically has 32 processor cells in the Y dimension, bi-directional edge FIFO 126 is 32 bits wide, with one bit of the edge FIFO connected to each processor on the $(-X, -Z)$ edge of the array.

The multi-dimensional processor system makes use of both parallel variables as well as non-parallel variables, which reside int he front end processor's memory. To load an n-bit parallel variable (where $n < =32$) into each of the processor cells of processor array 108, control processor 110 first loads 32 words of 32-bits in length of the processors on the $(+X, +Z)$ edge of the array into edge FIFO 126. Control processor 110 then instructs serializer 120 to generate a nanoinstruction sequence that loads a 32-bit temporary parallel variable in each processor in the $-Z$ face of the array with a corresponding value from its $-X$ neighbor. Since the processors on $(-X, -Z)$ edge 130 of processor array 108 have no neighbor in the $-X$ direction, each of these edge processors reads data from edge FIFO 126. Note that the temporary variable in each processor cell on the $(-X, -Z)$ edge of the array now contains 32-bits of the same bit position (for example 32 bits from bit position 0) of data to be loaded into the 32 processors on the $(+X, +Z)$ edge of the array, rather than an N-bit word value.

Control processor 110 then proceeds to load data destined for the processors in each successive $-X$ column in the $+Z$ plane of the array from the edge FIFO until each temporary parallel variable in every processor in the $-Z$ plane of the array has been loaded with data passed through edge FIFO 126.

Control processor 110 then instructs serializer 120 to produce a nanoinstruction sequence that causes each processor in array 108 to load data from its $-Z$ neighbor. In this manner, data is shifted in the $+Z$ direction and the entire sequence repeats to load data for the processors in each successive plane in the $+Z$ direction until the temporary variable in every processor in the array has been loaded with data passed through the edge FIFO.

At this point, every data bit that been loaded into the array resides in the temporary parallel variable in a processor at the X and Z coordinates where it is to be stored. However, most of these data bits are not in the processors at the proper Y coordinates. If the 32 words of the 32-bit temporary variable in each of 32 processor cells in every column is viewed as a $32 \times 32$ matrix of one bit values, all of the data bits may be moved to the proper Y coordinate by transposing all of these matrices in parallel. The result of this transpose operation is stored directly in the parallel variable that is the destination of the loaded data as the transpose is accomplished.

The control processor 110 reads data from processor array 107 by means of the inverse operation. First, the control processor instructs the serializer to produce a nanoinstruction sequence that causes the data in every processor cell column to be transposed in parallel, leaving the result in a 32-bit temporary parallel variable. Then, it instructs the serializer to produce a nanoinstruction sequence that causes the edge FIFO to be loaded with the 32 values of the temporary parallel variable from the processors on the $(-X, -Z)$ edge of the array, and every processor cell in the $-Z$ plane of the array to load its parallel temporary variable with the corresponding value from its $+X$ neighbor. The control processor then instructs the serializer to repeat this sequence until the processor array has written all values of the temporary parallel variable from the processors in the $-Z$ plane of the array to the edge FIFO. The control processor then instructs the serializer to produce another sequence of nanoinstructions that causes every processor in the array to load its parallel temporary variable with the corresponding value from its $+Z$ neighbor. The control processor repeatedly reads the edge FIFO and instructs the serializer to repeat the nanoinstruction sequence for reloading it until it has read the parallel variable from all processors in the array.

Controller 104 uses processor array 108 in an optimum configuration. For example, if the Z dimension of a given problem space is 1, controller 104 automatically configures processor array 108 as a two dimensional processor array, which provides a larger number of physical processors in the X and Y directions. In this manner, the X and Y dimensions of the problem space can be enlarged without exceeding the physical capacity of processor array 108.

Processor array 108 is a single instruction, multiple data (SIMD) processor array comprising a plurality of bit serial processor cells 132. Although individual processor cells 132 each have their own 2,048 bits of local memory, certain types of processing such as solving partial differential equations with finite difference approximations over a large number of nodes or displaying high resolution voxel databases, require a physical processor cell to produce an amount of intermediate data that is too large to be stored in its own internal memory. Accordingly, swapping RAM 116 provides additional memory to the processor cells. Swapping RAM 116 is generally interfaced with the processor array 108 through every fourth processor cell plane in the Y direction such as planes 133. During any cycle when the swapping RAM 116 is read, data is shifted four times in the −Y direction from the swapping RAM into each processor cell 132 in each successive Y plane. Writing data from processor cells 132 to swapping RAM 116 involves the reverse process.

Optional I/O devices 118 include devices such as a video processor and a two dimensional array of sensors such as temperature sensors. Optional I/O devices 118 interface with processor array 108 through every 16th column of processor cells in the X direction such as plane 136 and the +X plane 138 of the processor array. Interfacing I/O devices 118 with an entire plane of processor array 108 as well as every 16th column of processor cells in the X direction provides very fast (up to 1 gigabyte/second for an 8 MHz clock) input/output operations between processor array 108 and the optional I/O devices 118. Optional extended swapping RAM 134 may be provided to serve as additional memory to processor array 108. Optional extended swapping RAM 134 also interfaces with every 16th column of processor cells in the X direction as well as the +X plane of the array (although it appears on the −X side of the array in the figure for purposes of clarity).

Modifications and substitutions to the present invention by one of ordinary skill in the art are considered to be within the scope of the present invention and the claims which follow.

We claim:

1. A multi-dimensional processor array having three or more dimension, for processing multi-dimensionally structured data comprising:
    a plurality of processor cells, interconnected to form an N dimensional array having at least three dimensions, each of said plurality of processor cells having 2N dimensionally adjacent devices, said N dimensional array having a plurality of N−1 dimensional sub-arrays of said processor cells;
    each of said processor cells including a single data signal input element having at least 2N data signal input ports and one data signal output port, each one of said 2N data signal input ports coupled to one of said 2N dimensionally adjacent devices, for receiving data from any one of said 2N dimensionally adjacent devices, said one data signal input element output port coupled to each of said 2N dimensionally adjacent devices, for transmitting data to each of said 2N dimensionally adjacent devices;
    memory, responsive to memory addresses, for storing and retrieving data;
    an arithmetic logic unit, for receiving and executing processor cell instructions, said arithmetic logic unit comprised of first and second 8-to-1 multiplexors providing first and second arithmetic logic unit outputs, respectively, said first and second arithmetic logic unit outputs selectable as a function of three arithmetic logic unit input control signals coupled to each of said first and second 8-to-1 multiplexors; and
    three 3-to-1 multiplexors, coupled to at least said single data signal input element, said memory, and said first and second arithmetic logic unit output signals, each of said three 3-to-1 multiplexors providing one of said three arithmetic logic unit input control signals.

2. The processor array of claim 1 wherein said 2N devices include at least one processor cell.

3. The processor array of claim 1 wherein each processor cell includes an interface to permit reception of commands from a processor cell controller.

4. The processor array of claim 3 wherein said commands include said memory address.

5. The processor array of claim 3 wherein said interface includes said arithmetic logic unit operative for receiving and executing processor cell instructions from said processor cell controller.

6. The processor array of claim 5 further including a preprocessor device for providing processor array instructions to said processor cell controller in response to application programs running on the preprocessor device.

7. The processor array of claim 6 wherein said processor cell controller converts said processor array instructions to one or more intermediate instructions words.

8. The processor array of claim 7 wherein said processor cell controller further includes a processor cell instruction and address generator, responsive to said intermediate instruction words, for converting said intermediate instruction words into a sequence of processor cell instructions.

9. The processor array of claim 8 wherein said processor cell instructions include at least an instruction portion and an address portion.

10. The processor array of claim 9 wherein each of said processor cell instructions include a plurality of bits each having a preassigned designation.

11. The processor array of claim 10 wherein said preassigned bit designations include processor cell memory address bits and processor cell instruction bits.

12. The processor array of claim 12 wherein the 8 bit input to each of said 8-to-1 multiplexors form part of said processor cell instruction bits.

13. The processor array of claim 1 wherein said three multiplexors are collectively adapted for selecting any combination of at least five input signals.

14. The processor array of claim 13 wherein the output of each of said three 3-to-1 multiplexors is selected as a function of two input control signals.

15. The processor array of claim 14 wherein the two input control signals to each of said three multiplexors are provided by said processor cell instructions.

16. The processor array of claim 13 wherein said five input signals include input from memory, external devices and the processor cell's arithmetic logic unit first and second outputs.

17. The processor array of claim 16 wherein said external devices include dimensionally adjacent processor cells or data communications devices.

18. The processor array of claim 16 wherein said five input signals are stored in five single bit latches.

19. The processor array of claim 18 wherein said latches are enabled in response to latch enabling circuitry.

20. The processor array of claim 19 wherein said latch enabling circuitry is responsive to said processor cell instructions.

21. The processor array of claim 1 wherein said plurality of processor cells include a first group of processor cells having 2N dimensionally adjacent processor cells, and a second group of processor cells having fewer than 2N dimensionally adjacent processor cells.

22. The processor array of claim 21 wherein each processor cell from the second group of processor cells include at least one surplus data signal port operative for transmitting and receiving data to and from at least one additional device.

23. The processor array of claim 22 further including at least one device coupled to at least one of said surplus data signal ports, for transferring data between said device and one or more processor cells from said second group of processor cells.

24. The processor array of claim 23 wherein said first group of processor cells having 2N dimensionally adjacent processor cells include one or more of processor cells each having at least one data signal port coupled to said at least one device.

25. The processor array of claim 24 wherein said at least one device includes at least one input/output device.

26. The processor array of claim 24 wherein said at least one device includes at least one memory storage unit.

27. The processor array of claim 1 wherein said single data signal input element is comprises of one multiplexor having at least 2N inputs, for receiving input data from 2N dimensionally adjacent devices.

28. The processor array of claim 27 wherein said single data signal input multiplexor of each of said processor cells includes 2N+2 inputs, for receiving input data from 2N dimensionally adjacent devices, and for receiving as two input data signals said two output data signals from said arithmetic logic unit disposed within each processor cell.

29. A multi-dimensional processor system, for processing multi-dimensionally structured data comprising:
a multi-dimensional processor cell array, including a plurality of processor cells interconnected to form an N dimensional array, said N dimensional array having a plurality of N−1 dimensional sub-arrays of processor cells;
each of said processor cells including a single data signal input element having at least 2N data signal input ports and one data signal output port, each one of said 2N data signal input ports coupled to one of 2N dimensionally adjacent devices, for receiving data from any one of said 2N dimensionally adjacent devices, said one data signal input element output port coupled to each of said 2N dimensionally adjacent devices, for transmitting data to each of said 2N dimensionally adjacent devices;
a preprocessor device, for providing processor array instructions in response to applications programs executed on the preprocessor;
a processor cell controller, responsive to said processor array instructions, for converting said processor array instructions into one or more intermediate instructions words, said processor cell controller further including a processor cell instruction and address generator, responsive to said intermediate instruction words, for converting said intermediate instructions words into a sequence of processor cell instructions provided to each of said processor cells of said multi-dimensional processor array;
memory, responsive to memory addresses, for storing and retrieving data;
an arithmetic logic unit, for receiving and executing processor cell instructions, said arithmetic logic unit comprised of first and second 8-to-1 multiplexors providing first and second arithmetic logic unit outputs, respectively, said first and second arithmetic logic unit outputs selectable as a function of three arithmetic logic unit input control signals coupled to each of said first and second 8-to-1 multiplexors; and
three 3-to-1 multiplexors, coupled to at least said single data signal input element, said memory, and said first and second arithmetic logic unit output signals, each of said three 3-to-1 multiplexors providing one of said three arithmetic logic unit input control signals.

* * * * *